United States Patent [19]

Kashiwabara

[11] 3,873,220

[45] Mar. 25, 1975

[54] TUBE JOINT

[75] Inventor: Mikio Kashiwabara, Tokyo, Japan

[73] Assignee: Nihon Space Union Co., Ltd., Tokyo, Japan

[22] Filed: Jan. 23, 1973

[21] Appl. No.: 326,004

[30] Foreign Application Priority Data
Feb. 17, 1972 Japan.............................. 47-18909

[52] U.S. Cl................. 403/172, 403/217, 403/292, 403/295
[51] Int. Cl. ........................................... F16b 7/00
[58] Field of Search ......... 52/758 H, 656, 475, 285; 403/170, 173, 217, 218, 219, 292, 295, 172

[56] References Cited
UNITED STATES PATENTS

| | | | |
|---|---|---|---|
| 1,817,775 | 8/1931 | Sipe ............................... | 52/758 H |
| 2,911,243 | 11/1959 | Micozzi............................ | 52/758 H |
| 2,956,705 | 10/1960 | Clingman....................... | 403/172 X |
| 3,004,784 | 10/1961 | Selby .............................. | 52/758 H |
| 3,089,716 | 5/1963 | Berkowitz....................... | 52/758 H |
| 3,532,369 | 10/1970 | Reilly............................. | 403/178 X |

Primary Examiner—Werner H. Schroeder
Attorney, Agent, or Firm—Fleit & Jacobson

[57] ABSTRACT

A tube joint made of metal such as zinc or the like comprising a plurality of joint rods connected at their root ends, a tapered knurling tool fitted to and extending longitudinally along an outer wall of each of the joint rods, the root end of each of the knurling tools having a diameter equal to, or slightly larger than, the inner diameter of a pipe to be inserted, the pipe jointed with said knurling tool having an outside diameter that is tapered to become larger towards the inner part.

9 Claims, 4 Drawing Figures

TUBE JOINT

BACKGROUND OF THE INVENTION

This invention relates to a tube joint, and more particularly, to a joint made of metal such as zinc or the like, which comprises connecting a plurality of joint rods at their root ends, each rod having a relatively wide and longitudinally fitted and tapered knurling tool along an outer wall of its circumference, a diameter of the root end of said knurling tool being equal to, or slightly larger than, an inner diameter of an inserted pipe, and an outside diameter of the pipe jointed with said knurling tool being slightly larger, and still more larger in stepwise manner, towards the inner part.

The conventional tube joint is made of metal, e. g., as shown in Japanese utility model Pat. No. 22992 (1967), and is difficult to connect or detach because a screw bolt is locked by a spanner (as a bolt piece). Further, a method of inserting a tapered plastic material as a packing between the tube and metallic joint has recently been used, but this method has the defect of requiring the use of a wooden hammer in inserting or removing said tapered plastic materials and does not have good efficiency in operation.

The joint in accordance with this invention is a novel joint based upon a fundamentally improved technique which avoids the conventional defects.

The invention will be better understood from the following description taken in connection with the accompanying drawings.

DETAILED DESCRIPTION OF THE DRAWINGS

Figure 1:
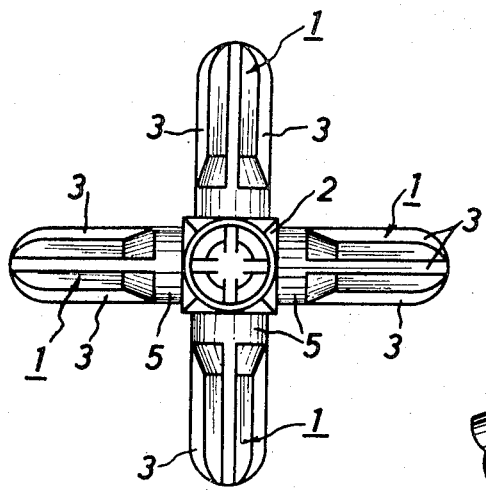
FIG. 1 is a plan view, partly in section, of a joint according to this invention.
Figure 2:
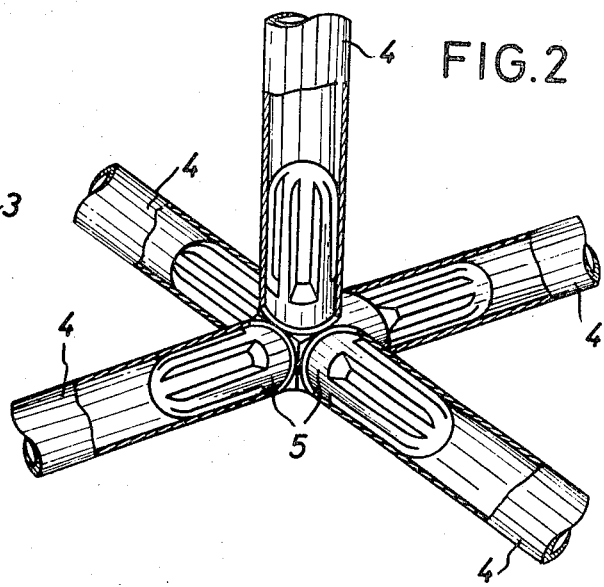
FIG. 2 is a perspective view of the joint of FIG. 1 connected to a plurality of pipes.

Referring to FIGS. 1 and 2, joint rods 1 are each connected at their root ends 5 with a connecting part 2. Four knurling tools 3 having defined widths run in the longitudinal direction along the outside diameter of each of the joint rods 1, and the ends of said knurling tools opposite the root ends 5 of joint rods 1 are tapered to form fixed diameter curves. Accordingly, the end opposite the root end 5 of each knurling tool is tapered so that it may easily be fitted into a connecting pipe in use, while at the root end, said knurling tool is tapered to gradually become larger until its diameter is equal to, or slightly larger than, the inside diameter of pipe 4. The root end 5 of each joint rod 1 is connected to both said knurling tool 3 and said connecting part 2, and has a slightly larger diameter than said knurling tool 3. One end of each pipe 4 is force fitted onto the root end 5 of each joint rod 1 so that said pipe will not come off.

Connecting part 2 is considerably larger than root end 5. The thickness of this step is equal to that of pipe 4 and is formed so that the outer surface of pipe 4 will be flush with the connecting part 2 when the joint rod 1 is fitted in pipe 4.

Figure 3:
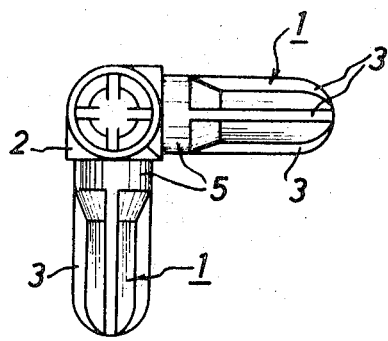
FIG. 3 is a plan view, partly in section, of a further joint according to this invention.

In FIG. 2 five joint rods 1 are connected with connecting part 2. Accordingly, the following explanation will be directed to a joint connected with five pipes 4, however, it will be understood that various designs may be made according to the number of connected pipes, for example, as shown in FIGS. 3 and 4.

Figure 4:
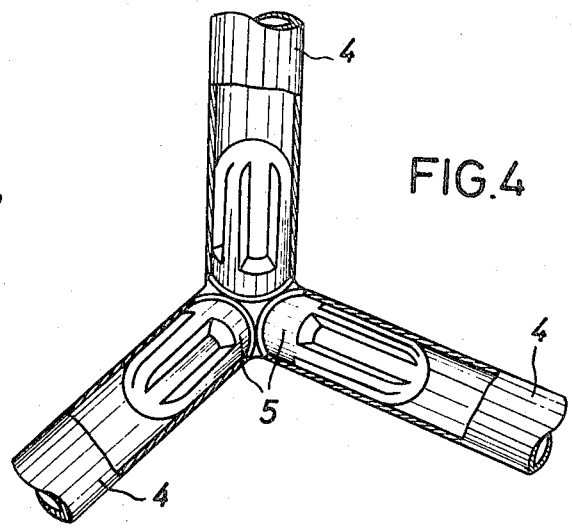
FIG. 4 is a perspective view of the joint of FIG. 3 connected to a plurality of pipes.

In using the joint according to this invention, when the joint rod 1 is forcedly inserted into the pipe 4, as shown in FIGS. 2 and 4, joint rod 1 is preceded by knurling tool 3 which is spaced around said joint rod, and finally the root end 5 contacts the side wall of the pointed end of pipe 4 so closely that it does not fall off or move easily.

In removing the joint from pipe 4, the joint may easily be drawn out by pulling said joint and pipe to the left and right, respectively, and rotating pipe 4.

A tube joint according to this invention may be produced cheaply and in great quantities, because it can be uniformly formed by using such metals as zinc (e.g., diecast) or the like. Further, the surface can be treated with a desired plating.

The tube joint in accordance with this invention as described above, is attached with a longitudinal directed and tapered knurling tool 3 around the external circumference of the joint rod.

Accordingly, the knurling tool 3 may be used as the lead and smoothly fitted into the pipe due to the considerable elasticity of the knurling tool.

When the knurling tool 3 is once inserted into the pipe 4, it contacts the side walls of the pipe 4 so closely that the pipe 4 will not move, yet it allows the pipe 4 to be smoothly drawn out.

Further, the root end 5 has a larger diameter than that of the knurling tool 3 according to this invention. The root end 5 is connected with the root end of the knurling tool 3, and this root end 5 closely contacts the pointed end of the pipe 4. This results in preventing disengagement of pipe 4 from a joint; reliable fitting; and high operation efficiency.

I claim:

1. A joint made of metal and adapted to be connected to a plurality of round pipes consisting essentially of a plurality of joint rods, means for connecting said joint rods at their root ends so that their longitudinal axes interesect and for forming a shoulder for said pipes to abut against, a knurling tool connected to each of said joint rods near their root ends, each of said joint rods and said knurling tools having a round shape in transverse crosssection, said knurling tools extending in the longitudinal direction of said joint rods, said joint rods and said knurling tools at the point of connection to said joint rods each having a diameter which is at least equal to the inner diameter of said pipe and said knurling tools being tapered in the longitudinal direction of said joint rods, each of said knurling tools being adapted to fit inside of said pipes and the root ends of said knurling tools and of each of said joint rods being adapted to snugly engage said pipes.

2. The joint of claim 1 in which the root ends of said joint rods have a slightly larger diameter than said knurling tools.

3. The joint of claim 1 in which said metal is zinc.

4. A metal joint and a round pipe combination consisting essentially of a plurality of joint rods, means for connecting said joint rods at their root ends so that their longitudinal axes intersect and for forming a shoulder for said pipes to abut against, a knurling tool connected to each of said joint rods near their root ends, each of said joint rods and said knurling tools having a round shape in transverse cross-section, said knurling tools extending in the longitudinal direction of said joint rods, said joint rods and said knurling tools at the point of connection to said joint rods each having a diameter which is at least equal to the inner diameter of said pipe and said knurling tools being tapered in the longitudinal direction of said joint rods, and a pipe fitting over each of said knurling tools and snugly engaging the root ends of said knurling tools and each of said joint rods.

5. The combination of claim 4 in which the root ends of said joint rods have a slightly larger diameter than said knurling tools.

6. The combination of claim 4 in which said metal is zinc.

7. The combination of claim 4 in which the pipes are tapered and have their largest diameter nearest the root end of said joint rods.

8. The tube joint of claim 1 in which the knurling tools consist essentially of ridges extending in the longitudinal direction of said joint rods.

9. The combination of claim 4 in which the knurling tools consist essentially of ridges extending in the longitudinal direction of said joint rods.

* * * * *